United States Patent Office 2,976,460
Patented Mar. 21, 1961

2,976,460

CONTROL CIRCUITS FOR GAS-FILLED, GRID-CONTROLLED DISCHARGE TUBES

Leslie Frederick Odd, Northaw Egbert Gardens, Wickford, England

Filed Jan. 12, 1959, Ser. No. 786,409

Claims priority, application Great Britain Jan. 13, 1958

8 Claims. (Cl. 315—204)

This invention relates to control circuits for gas-filled, grid-controlled discharge tubes and has particular reference to such circuits for use with discharge tubes, for example thyratrons, used in control circuits for D.C. motors.

Close control is sometimes required to be exercised over the speed or other characteristic of a D.C. motor but where the latter is energised via one or more thyratrons, it has hitherto been impracticable to provide an effective arrangement for controlling the thyratrons in an economic manner.

It is, accordingly, an object of the present invention to provide an improved control circuit for gas-filled, grid-controlled discharge tubes.

According to the present invention, a control circuit for a gas-filled, grid-controlled discharge tube comprises a repetitive, rising-potential, waveform generator connected with a source of variable D.C. bias to a pulse generator adapted to produce an output pulse when the instantaneous value of the amplitude of the repetitive rising potential waveform together with the variable D.C. bias exceeds a predetermined value, and means for applying the output pulse to the grid of a gas-filled, grid-controlled discharge tube.

The rising potential waveform may be, for example, a sawtooth waveform which can be easily synchronised with the supply frequency of the discharge tube.

Preferably, the pulse generator comprises a relaxation type oscillator which in one embodiment of the invention includes a gas-filled, grid-controlled discharge tube whose firing cycle is determined by the charge and discharge of a capacitor in parallel connection with the discharge tube. The pulse generator may, however, take other forms, for instance, cold cathode tubes, multi-vibrators including transistor multi-vibrators could be used instead.

Alternatively, a control circuit for a gas-filled, grid-controlled discharge tube comprises a D.C. energised (as herein defined) repetitive rising potential waveform generator connected with a source of variable D.C. bias to an intermediate gas-filled, grid-controlled discharge tube in such manner as to control the firing cycle thereof.

Each D.C. energised repetitive rising waveform generator may be a sawtooth waveform generator and the generator may consist of a relaxation type oscillator. In one embodiment of the invention, the oscillator comprises a gas-filled, grid-controlled discharge tube whose firing cycle is controlled by a capacitor in parallel connection with the tube. The oscillator may be triggered by an A.C. supply. The term "D.C. energised" is not intended to exclude generators employing indirectly heated valves but only those generators the phase of whose output is dependent upon an A.C. supply used to energise the reactive components of the generator.

The intermediate tube may conveniently form part of a pulse generator of the type described above.

The control circuit may comprise a first repetitive rising potential waveform generator whose output is connected with a first source of variable D.C. bias to a second repetitive rising potential waveform generator in such a manner as to control the phase of the output from the second generator, the output of the second generator being applied together with a second source of variable D.C. bias to a pulse generator adapted to produce an output pulse when the instantaneous valve of the amplitude of the applied waveform together with the second D.C. bias exceeds a predetermined value, and means for applying the output pulse to the control grid of a gas-filled, grid-controlled discharge tube.

The control circuit may comprise a number of second generators, series-connected in such manner that the output of one stage is applied to the input of a succeeding stage together with a variable D.C. bias source. The output of the final stage is connected to the pulse generator.

By way of example only, two control circuits embodying the invention will now be described in greater detail with reference to the accompanying circuit diagrams, of the two embodiments.

Figure 1A:
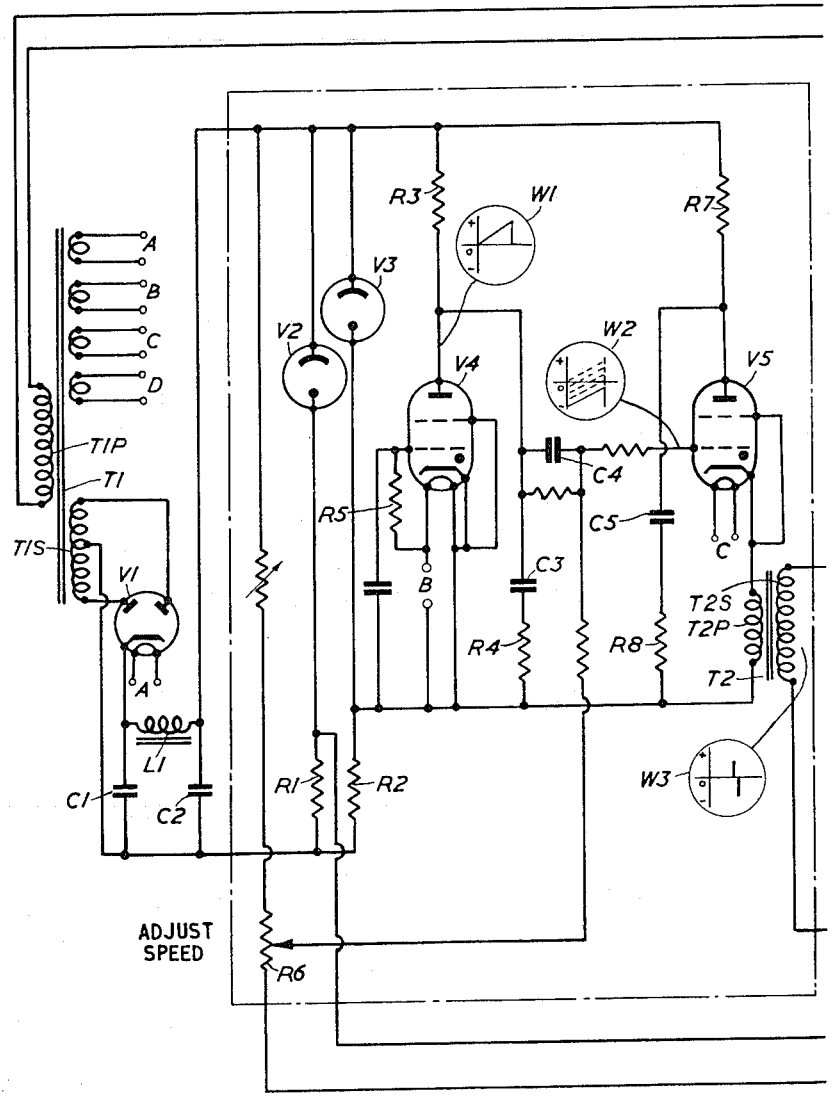
Fig. 1 is a schematic diagram of a circuit in accordance with one embodiment of this invention.
Figure 1B:
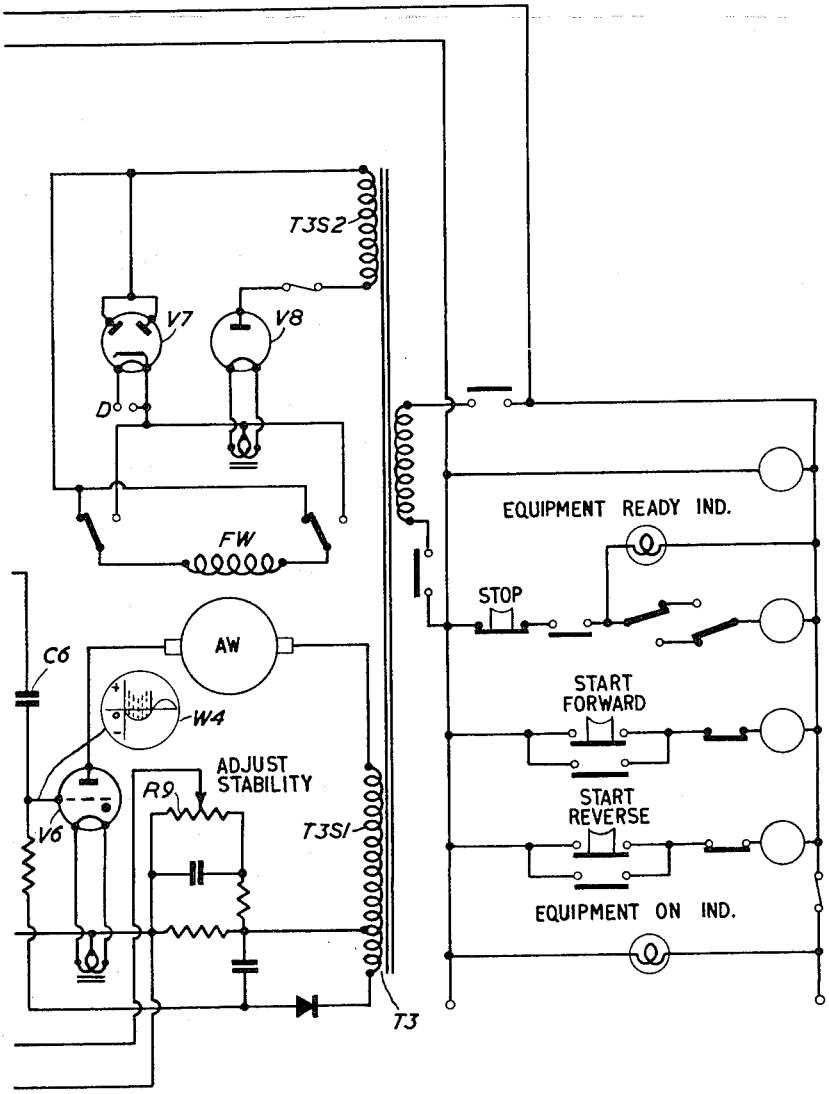

In Fig. 1, input winding T1P of transformer T1 is connected across a source of alternating current while output winding T1S is joined across the anodes of a full wave rectifier V1. The output of V1 is connected via smoothing circuit consisting of choke L1 and capacitors C1 and C2 to voltage stabilisers V2 and V3 in series connection respectively with resistors R1 and R2.

Across V3 is connected a thyratron V4 in series connection with anode resistor R3. V4 is shown as a tetrode with its screen grid connected to its cathode. Across the anode and cathode of V4 is connected a resistor-capacitor combination R4C3 while the control grid of V4 is connected to one terminal of its heater via resistor R5.

V4 is capacity-coupled by capacitor C4 to the control grid of a second thyratron V5 also shown as a tetrode with its screen grid connected to its cathode. Also joined to the control grid of V5 is a source of variable D.C. bias derived from potentiometer R6.

The junction of the anode of V5 with anode resistor R7 is coupled via capacitor C5 and resistor R8 to one terminal of an input winding T2P of a transformer T2, the other terminal of T2P being joined to the cathode of V5. The output winding T2S of transformer T2 is connected via capacitor C6 across the grid and cathode circuit of a further thyratron V6 whose anode-cathode circuit is in series connection with the armature AW of a D.C. motor and part of a secondary winding T3S1 of transformer T3.

The field winding FW of the motor is energised from a secondary winding T3S2 of transformer T3 via rectifiers V7 and V8 according to the direction of rotation of the motor.

Energisation of the input winding T3P of transformer T3 is controlled by means of a control panel incorporating the various standard controls as seen in the drawing.

Limited control over the stability of the D.C. motor is provided by a potentiometer R9 connected as shown to vary the voltage appearing across the armature AW.

The valve V4 operates as a repetitive rising potential waveform generator, in this case a sawtooth generator, whose natural frequency is somewhat less than that of the A.C. supply and is determined by the time constant of the combination R3, R4, C3. The generator is triggered by the A.C. supply across the connection between the grid and the heater of V4. At the output of V4 appears a voltage of a sawtooth waveform indicated by waveform W1.

The sawtooth waveform output of V4 is applied to the grid of V5 together with the variable D.C. bias obtained from R6 which gives a vertical shift to the sawtooth waveform as indicated by waveform W2.

Tube V5 operates as a pulse generator triggered by the potential applied to its control grid when this potential reaches the critical grid voltage of V4. The time constant of the combination R7, R8, C5 determines the duration of the pulses and is arranged to produce short duration pulses. Transformer T2 couples the output of V5 to V6, waveform W3 indicating the waveform of the output appearing across winding T2S.

With suitably chosen valves for R7 and C5 and appropriately designed transformer T2, the capacitor C5 will charge to an appreciable extent only while the grid of V5 is biased to cut-off, that is, before the combined sawtooth waveform and D.C. bias fires V5. The first pulse which occurs after firing is of sufficient amplitude and duration to be transmitted through T2 but subsequent pulses which occur during the firing or V5 are of too small amplitude and too high frequency to be transmitted through T2. The initial pulse must produce an output from T2 of sufficient amplitude to fire V6. The pulse amplitude required will, of course, depend upon the standing bias applied to the control grid of V6 and the duration of its critical grid current. Pulses of +40 volts amplitude and 50 microsecond duration will be effective in most cases.

The phase of the positive going pulse shown in waveform W3 determines the instant during the positive half cycles of the A.C. supply at which V6 fires and by varying the D.C. bias applied to V5, the phase of the pulse and thus the firing instant of V6 can be changed as is indicated by waveform W4. V6 operates in the well-known manner to control the flow of current through the armature AW and thus the speed of rotation of the motor.

It can be arranged that the D.C. bias applied to V5 be made to vary automatically with, say, motor speed, thereby providing automatic speed control.

It will be appreciated that the control system described above provides a very exact control over the firing of V6 and that the control is applicable over the full 180° of the positive half-cycles of the A.C. supply. Moreover, the frequency of the sawtooth waveform generated by V4 is independent of the A.C. supply frequency and thus remains unaffected by changes in the waveform of the latter. The use of the pulse output of V5 to control V6 means that the instant of firing of the latter is accurately determined and can be varied by means of the relatively small D.C. bias applied to V5. There is of course no flow of grid current in V6 during negative half cycles of the A.C. supply.

It will of course be understood that the control circuit described above can be used to control thyratrons used in other forms of circuit than D.C. motor control circuits and can operate with any thyratron without reference to the characteristics of the latter.

Further, the control circuit can be used to control full-wave and polyphase rectifiers. Adjustment of the valves of R3 and C3 and the application of a suitable synchronising signal to the grid of V4 can be used to modify as necessary the phase of the output pulses from T2.

Figure 2:
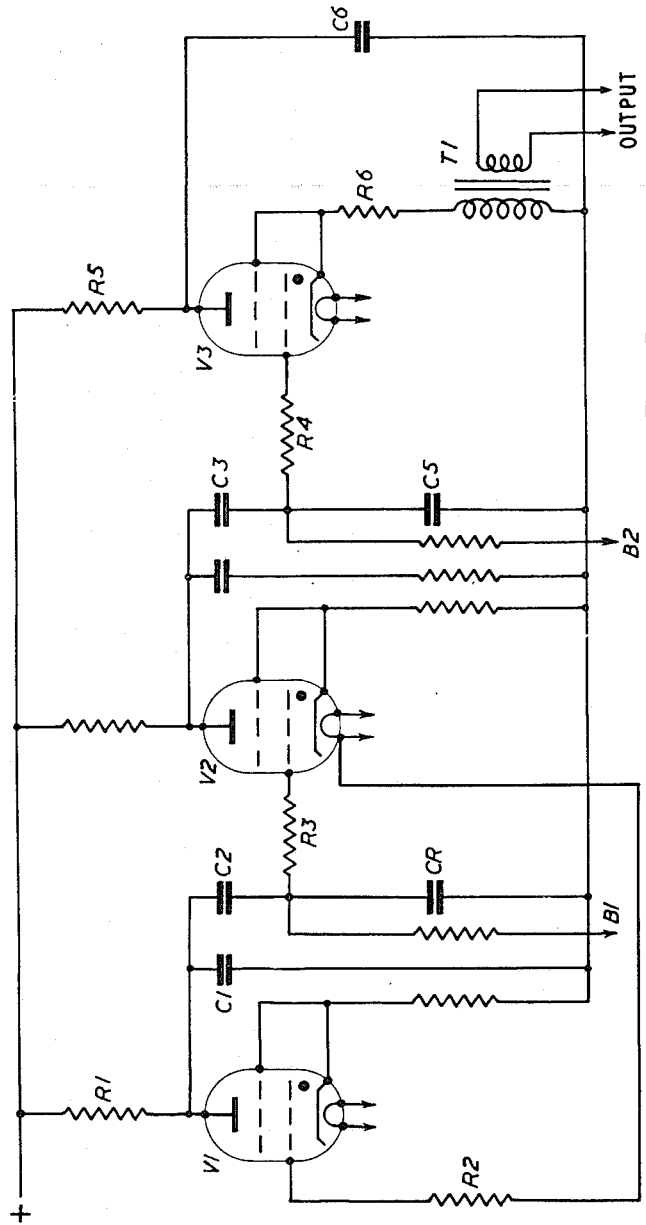
Fig. 2 is a schematic illustration of the other embodiment of this invention.

Referring now to Figure 2 of the accompanying drawings, V1 is a tetrode thyratron and is connected as shown as a relaxation oscillator producing a sawtooth waveform output whose natural frequency is determined by the time constant of the combination R1C1. The generator is triggered by the A.C. heater supply of a second thyratron V2 applied to the control grid of V1 via resistor R2.

The sawtooth output of V1 appears across capacitors C2, CR the junction of which is connected via resistor R3 to the control grid of the second thyratron V2 and to this control grid is joined a first source of variable D.C. biassing potential B1.

V2 is also connected as a sawtooth waveform generator of the same natural frequency as V1 but its firing cycle is determined by the instantaneous value of the sawtooth waveform output from V1 taken with the D.C. biassing potential applied from the source B1. The effect of change in the applied biassing potential is to advance or retard the instant of firing of V2.

The output of V2 appears across capacitors C3, C5 whose junction is connected via resistor R4 to the control grid of a third thyratron V3 operated as a pulse generator and triggered when the instantaneous value of the amplitude of the output of V2 taken together with a D.C. potential applied from a second variable D.C. bias source B2 reaches the critical grid voltage of V3. The time constant of the combination R5R6C6 determines the duration of the pulse produced and is selected to produce a short duration pulse of the order of 50 microseconds. The final pulse output of V3 appears across the secondary winding of transformer T1 whose primary winding is in series connection with R6 and C6 across the anode-cathode circuit of V3.

The phase of the output of V2 is variable by means of the variable D.C. bias source B1 whilst the phase of the pulse produced by V3 can be changed by means of the bias applied from the bias source B2. Thus, the phase of the output pulse appearing across the secondary winding of T1 is dependent upon the values of bias applied from both sources B1 and B2.

The circuit may be expanded to include several stages similar to V2 thus increasing the number of bias sources required and if each bias source represents a variable quantity, the phase of the output pulse finally obtained in the secondary winding of T2 is dependent upon all of the variables.

I claim:

1. A control circuit for a unidirectional current-flow control device, said circuit comprising a unidirectional current-flow control device having supply electrodes and a control electrode, an A.C. supply connected between said supply electrodes, the control device being operable by a pulse applied to its control electrode only during alternate half cycles of the A.C. supply, a pulse generator, an input point and an output point for said pulse generator, a source of variable D.C. bias connected to said input point, a repetitive rising potential waveform generator also connected to said input point, the pulse generator producing an output pulse whose phase respective to the commencement of said alternate half cycles of the A.C. supply depends upon the magnitude of said D.C. bias, and pulse application means connected between said output point and the control electrode of said control device for applying a variable-phase output pulse to said control electrode to determine the instant during a said alternate half cycle of the A.C. supply at which said control device commences to conduct.

2. A control circuit for a unidirectional current-flow control device, said circuit comprising a unidirectional current flow control device having supply electrodes and a control electrode, an A.C. supply connected between said supply electrodes, the control device being operable by a pulse applied to said control electrode only during alternate half cycles of the A.C. supply, a first repetitive rising potential waveform generator, a second repetitive rising potential waveform generator, an input point and an output point for the second generator, a first source of variable D.C. bias connected together with said first waveform generator to the input point of said second waveform generator whose output waveform phase is dependent upon the magnitude of said first D.C. bias, a pulse generator having an input point and an output point, a second source of variable D.C. bias connected together with the output point of said second waveform generator to the input point of said pulse generator which produces an output pulse whose phase respective to the commencement of said alternate half cycles of the A.C. supply depends upon the magnitudes of both said first and second D.C. biases and pulse application means connected between the output point of said pulse generator and the control electrode of said control device for applying a variable-phase output pulse to said control electrode to determine the instant during a said alternate half cycle of the A.C. supply at which said discharge tube commences to conduct.

3. A control circuit for a unidirectional current flow control device, said circuit comprising a unidirectional-current-flow control device having supply electrodes and a control electrode, an A.C. supply connected between said supply electrodes, the control device being operable by a pulse applied to its control electrode only during alternate half cycles of the A.C. supply, a first repetitive rising potential waveform generator, a plurality of second repetitive rising potential waveform generators connected in cascade, an input point for the first of said second waveform generators, said first waveform generator connected to the input point of the first of said second waveform generators, a separate source of variable first D.C. bias for each of said second waveform generators, the output phase of each of said waveform generators being dependent upon the magnitude of its associated D.C. bias, an output point for the final one of said second waveform generators, a pulse generator, an input point and an output point for said pulse generator, a source of second variable D.C. bias connected together with said output point of the final one of said second waveform generators to the input point of the pulse generator which produces an output pulse whose phase respective to the commencement of said alternate half-cycles of the A.C. supply depends upon the magnitudes of said first and second D.C. biases, and pulse application means connected between the output point of said pulse generator and the control electrode of said control device for applying a variable-phase output pulse to said control electrode to determine the instant during a said alternate half cycle of the A.C. supply at which said discharge tube commences to conduct.

4. A control circuit for a thyratron device, said circuit comprising a thyratron device having supply electrodes and a firing electrode, an A.C. supply connected between said supply electrodes, the thyratron device being operable by a pulse applied to its firing electrode only during alternate half cycles of the A.C. supply, a repetitive rising potential waveform generator, a pulse generator, an input point and an output point for said pulse generator, a source of variable D.C. bias connected together with said waveform generator to the input point of said pulse generator which produces at the output point an output pulse whose phase relative to the commencement of said alternate half cycles of the A.C. supply is determined by the magnitude of said D.C. bias, and pulse transferring means connected between said output point and said firing electrode for applying a variable-phase pulse from said output point to the firing electrode during a said alternate half cycle of the A.C. supply to determine the instant which the thyratron device commences to conduct.

5. A control circuit for a thyratron device, said circuit comprising a thyratron device, supply electrodes and a firing electrode for said device, an A.C. supply connected between said supply electrodes, the thyratron device being operable by a pulse applied to said firing electrode only during alternate half cycles of the A.C. supply, a first repetitive rising potential waveform generator, an input point and an output point for said first waveform generator, a source of first variable D.C. bias, a second repetitive rising potential waveform generator connected together with said first D.C. bias to the input point of said first waveform generator whose output waveform phase is determined by the magnitude of said first D.C. bias, a pulse generator, an input point and an output point for said pulse generator, a source of second variable D.C. bias connected together with the output point of said first waveform generator to the input point of said pulse generator which produces at its output point an output pulse whose phase relative to the commencement of said alternate half cycles of the A.C. supply is determined by the magnitudes of said first and second D.C. biases, and pulse transferring means connected between the output point of said pulse generator and said firing electrode for applying a variable phase output pulse during a said alternate half cycle of the A.C. supply to determine the instant at which the thyratron device commences to conduct.

6. A control circuit for a thyratron device, said circuit comprising a thyratron device having supply electrodes and a firing electrode, an A.C. supply connected between said supply electrodes, the thyratron being operable by a pulse applied to its firing electrode only during alternate half cycles of the A.C. supply, a first repetitive rising potential waveform generator, a plurality of second repetitive rising potential waveform generators connected in cascade, an input point for the first of said second waveform generators, said first waveform generator connected to the input point of the first of said second waveform generators, a separate source of first variable D.C. bias for each of said second waveform generators, the output phase of each of said second waveform generators being dependent upon the magnitude of its associated D.C. bias, an output point of the final one of said second waveform generators, a pulse generator, an input point and an output point for said pulse generator, a source of second variable D.C. bias connected together with said output point of the final one of the second waveform generator to the input point of said pulse generator which produces an output pulse whose phase relative to the commencement of said alternate half cycles of the A.C. supply depends upon the magnitudes of said first and second D.C. biases, and pulse transferring means connected between the output point of said pulse generator and said firing electrode for applying a variable phase output pulse during a said alternate half cycle of the A.C. supply to determine the instant at which the thyratron device commences to conduct.

7. A control circuit for a thyratron device, said circuit comprising a thyratron device having supply electrodes and a firing electrode, an A.C. supply connected between said supply electrodes, the thyratron device being operable by a pulse applied to its firing electrode only during alternate half cycles of the A.C. supply, a repetitive rising potential waveform producing relaxation-type oscillator, a pulse generator, an input point and an output point for said pulse generator, a source of variable A.C. bias connected together with said relaxation-type oscillator to the input point of said pulse generator which produces at the output point an output pulse whose phase relative to the commencement of said alternate half cycles of the A.C. supply is determined by the magnitude of said D.C. bias, and pulse transferring means connected between said output point and said firing electrode for applying a variable-phase pulse from said output point to the firing electrode during a said alternate half cycle of the A.C. supply to determine the instant at which the thyratron device commences to conduct.

8. A control circuit for a thyratron device, said circuit comprising a thyratron device having supply electrodes and a firing electrode, an A.C. supply connected between said supply electrodes, the thyratron device being operable by a pulse applied to its firing electrode only during alternate half cycles of the A.C. supply, a repetitive rising potential waveform generator, a pulse generating relaxation-type oscillator, an input point and an output point for said relaxation-type oscillator, a source of variable D.C. bias connected together with said waveform generator to the input point of said relaxation-type oscillator which produces at the output point an output pulse whose phase relative to the commencement of said alternate half cycles of the A.C. supply is determined by the magnitude of said D.C. bias, and pulse transferring means connected between said output point and said firing electrode for applying a variable-phase pulse from said output point to the firing electrode during a said alternate half cycle of the A.C. supply to determine the instant which the thyratron device commences to conduct.

References Cited in the file of this patent

UNITED STATES PATENTS

| | | |
|---|---|---|
| 2,720,612 | Leonard | Oct. 11, 1955 |
| 2,723,371 | Featherstone | Nov. 8, 1955 |